Oct. 30, 1934.                     C. D. BURNEY                  1,979,191
                          COOLING SYSTEM FOR AUTOMOBILES
                     Filed Dec. 22, 1932           2 Sheets-Sheet 1
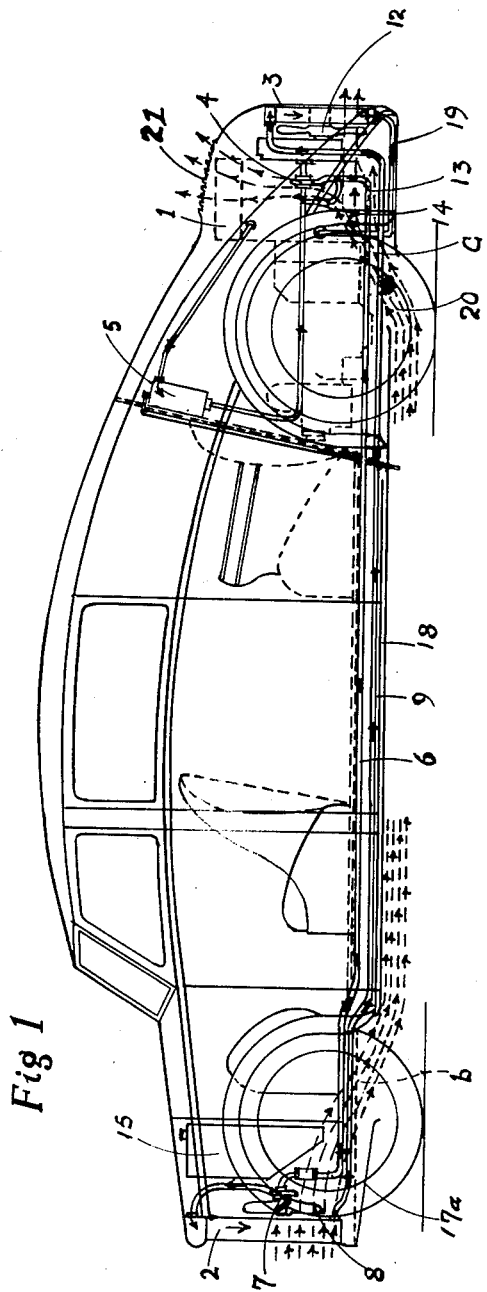
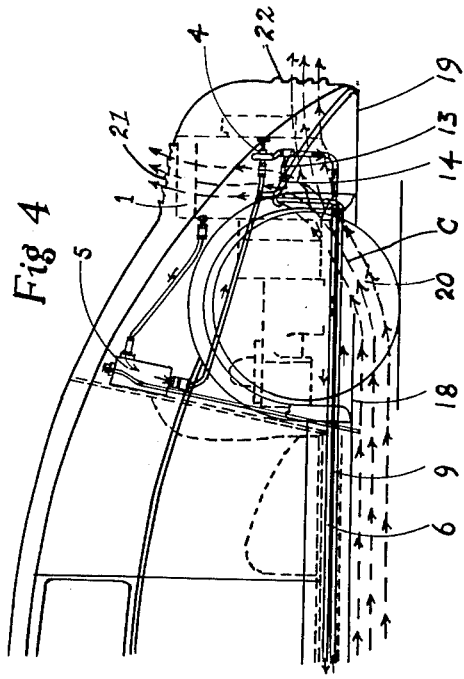
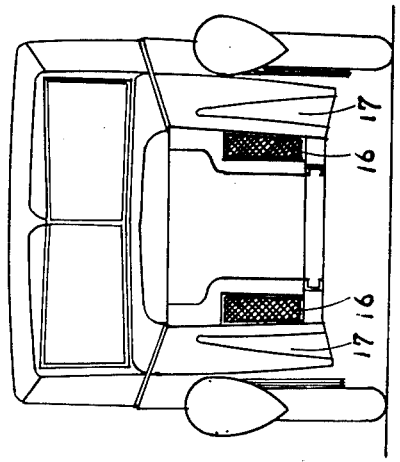
Inventor:
Charles D. Burney Oct. 30, 1934.   C. D. BURNEY   1,979,191
COOLING SYSTEM FOR AUTOMOBILES
Filed Dec. 22, 1932   2 Sheets-Sheet 2

Inventor
Charles D. Burney.
By Cushman, Bryant, Darby & Cushman
Attorneys.

Patented Oct. 30, 1934

1,979,191

UNITED STATES PATENT OFFICE 1,979,191

COOLING SYSTEM FOR AUTOMOBILES

Charles Dennistoun Burney, Westminster, London, England

Application December 22, 1932, Serial No. 648,512
In Great Britain January 5, 1932

16 Claims. (Cl. 180—54)

This invention relates to automobile vehicles of the kind in which the engine, with or without the gearbox, is situated in the vicinity of the rear wheels, vehicles of this type being hereinafter referred to as rear engined cars.

The object of the invention is to provide an improved cooling system for automobile vehicles of the above kind.

An automobile according to the present invention has a water circulating system between an engine at the rear and a radiator at the front, which water circulating system includes a water reservoir tank located above the level of the engine and radiator. I may provide a water cooled engine at the rear to which cooling water is supplied by a radiator at the front of the car which receives its water supply from the discharge side of a water motor driving a fan for the radiator, the inlet side of said water motor being connected by a pressure pipe line with a pressure pump drawing its water supply from a reservoir tank above the level of the radiator and engine, the engine water jacket discharging into said reservoir tank.

Further, I may provide an additional radiator at the rear of the car which is preferably interposed in the water circulating system between the engine water jacket outlet and front radiator intake.

Preferably the sides of the front of the car behind the radiator are cut away to form recesses for the reception of the wheels in steering, rearwardly facing openings being formed in the walls of said recesses to permit the escape of air from behind the front radiator.

Further, part of the air behind the radiator may be diverted to the interior of the car. Since the radiator is remote from the engine, this air is not contaminated by passing over the engine which has been heated as is the case with front engine cars, and is therefore suitable for heating the interior of the car. To this end, adjustable louvres or their equivalent may be provided so that warm air may be deflected in part into the interior of the car as desired.

The aforesaid cut-away portions in the body of the car behind the radiator may extend from about the axis of the front wheels to a point situated behind the front wheels, through which cut-away portions air can pass freely. Rearwardly facing louvres, gratings or grids may be provided in the wall of the car in said cut-away portions. These cut-away portions for accommodating the rear portions of the front wheels when locked round during steering, have the advantage of permitting a wide angle of lock to be obtained without increasing the lateral distance between the front wheels.

The petrol tank may be situated behind the front radiator on or in close proximity to a transverse bulkhead which isolates the front compartment of the car containing the radiator and the petrol tank from the passenger compartment of the car. The sides or bottom of the petrol tank may be so shaped (for example, by curving or inclining them) that the air from the radiator may be directed both laterally of and downwardly beneath the petrol tank. The aforesaid cut-away portions, as viewed from the outside of the car, are preferably concave in configuration so as to increase the suction or ejector effect created at this point and draw air from the compartment behind the radiator through the louvres or grids located in the wall of the car and the said cut-away portions, thus assisting the radiator air to escape.

The water reservoir, if fitted at the highest portion of the system, may be used as a filling tank for the system and leak-off cocks may be provided at the highest points of both radiators, so that when the water system is being filled, all air locks can be avoided by keeping both leak off cocks open and filling the reservoir until water is discharged from the cocks. The leak off cocks are then closed and further water introduced until the tank is filled.

The system is thus free of air locks and will operate as a drowned system.

Another method of keeping the system drowned is to provide a spring loaded valve at the highest point of the water system, as for example in the top of the water reservoir, the loading of this valve being sufficient to retain the water when the car is on an incline. It will be appreciated that, on account of the fact that the radiator is situated at one end of the car and the engine at the other end, there may be a very considerable relative difference between the respective levels of the engine and radiator when the car is going up or down a steep hill, and, accordingly, unless the system is a drowned system, by reason of the fact that a tank is provided at the highest point of the car, the water in the system would escape from the normal vent holes in the radiators.

In order that the invention may be fully understood and readily carried into practice, it is illustrated by way of example only, and not in a limiting sense, by the accompanying drawings, in which:—

Figure 1 is a diagrammatic longitudinal section of a motor car having my invention applied thereto in the preferred manner.

Figure 2 is a front view of the car, with parts removed.

Figure 4 is a longitudinal sectional and diagrammatic view of the rear portion of a car having the invention applied thereto in a modified manner.

Figure 3:
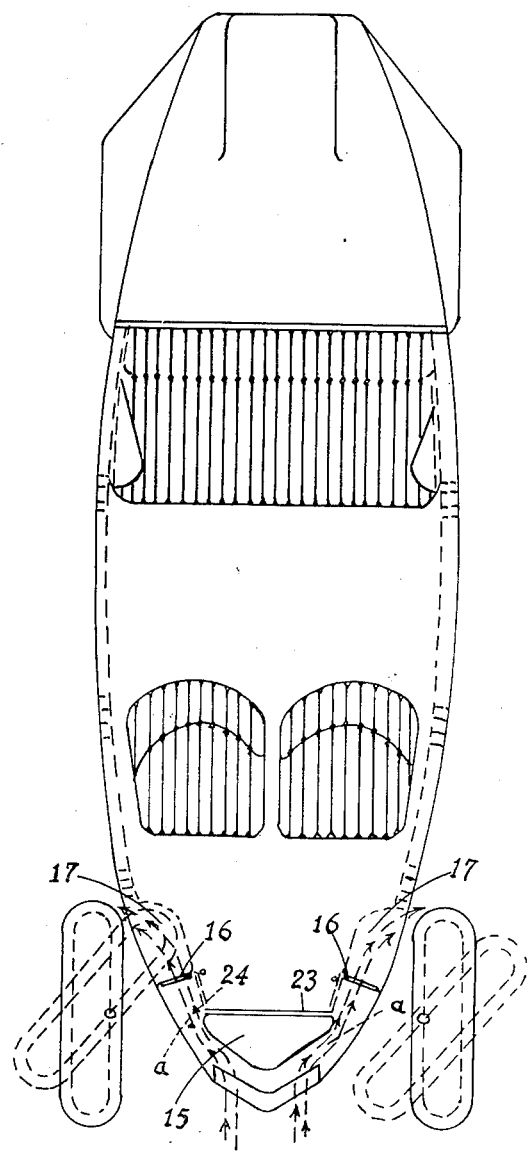
Figure 3 is a diagrammatic plan view.

Referring to Figures 1, 2 and 3, the engine 1 is disposed behind the back axle and is water cooled by means of a water circulating system including a pair of radiators, 2 at the front, and 3 at the rear of the car.

The engine mechanically drives a water pump 4 which draws water from a reservoir tank 5, and forces it along pipe 6 to the front end of the car, where it drives a water motor 7 which operates a suction fan 8. The water then passes to the top of the front radiator 1 and downwardly therein to return pipe 9, which passes along the car again and upwardly to the top of the rear radiator 3, from the bottom of which it passes to the water jacket of the engine 1. From this water jacket the water passes to reservoir tank 5, to complete the water circulation circuit.

The tank 5 is located above the level of the engine 1 and radiators 2 and 3, so that at all times, even when the car is on a steep incline, the water cooling system is drowned. For the sake of safety, however, the tank 5 has a spring loaded relief valve, which permits the escape of water should any excessive pressure arise in the system, but yet prevents leakage of water in the position of maximum inclination of the car. Further the tank is fitted with a suction valve, which allows air to be drawn into the system should the pressure fall below a predetermined value, so that the system is never called upon to work at subatmospheric pressure.

Adjacent to the rear radiator 3 is mounted an engine driven fan 12 which drives air continuously through the radiator 3, and in association with the pump 4 is a short circuiting pipe 13, which passes through a spring loaded control valve contained in casing 14 which opens when the discharge pressure produced by the pump 4 exceeds the inlet pressure by a predetermined amount so that the control valve becomes unbalanced.

The function of the radiators 2 and 3 is of course the usual one of cooling the water circulating through the engine jacket and special provision is made according to this invention for air cooling these radiators.

In the first place, for cooling the front radiator 2, which is the largest of the two radiators, the air encountered by the radiator passes therethrough and is then divided into three streams. Firstly, it is divided into two laterally diverging streams $a$, $a$, Figure 3, by the inclined side walls of the petrol tank 15, which is of triangular cross section, and these two streams pass out of the car body through rearwardly facing openings 16, which are covered by wire grids and debouch into cut away or recessed portions 17 in the car body, which recessed portions 17 also serve to accommodate the wheels when locked round and thus enable a greater lock to be obtained than would otherwise be the case, as indicated in Figure 3. The air streams $a$ on leaving the recesses 17 join with the main air flow along the sides of the car body, and this main air flow exerts an ejector action on the air streams $a$ and thus causes a forced draught through the radiator 2 and the space behind the radiator.

Secondly, some of the air passing through the radiator 2 encounters the downwardly inclined bottom surface of the petrol tank 15, and is thereby deflected in a stream $b$ towards an opening in the bottom of the car, which is left between a front under shield 17$a$ and a main under shield 18 which extends nearly to the rear of the car, where it is separated from a rear under shield 19 by another opening 20. The main flow of air beneath the car again has an ejector action on the stream $b$ which increases the suction through the radiator 2 and space in rear thereof, the stream being carried along beneath the car with the main air flow, as indicated by the dotted lines in Figure 2, until it reaches the rear end of the car where a stream of air $c$ is sucked up through the opening 20, partly under streamline action and partly owing to the suction of the fan 12 by which it is finally discharged rearwardly through the rear radiator 3, aided by the natural suction existing at the tail end of the car. It will be observed that this air stream $c$ will pass over the surface of the crank case of the engine 1 which will thus receive an appreciable degree of cooling. Part of the air stream $c$ will also be drawn upwardly over the surface of the engine and sucked out through the louvres 21 in the upper surface of the tail of the car by the main air stream passing along said surface.

In the modification illustrated by Figure 4, the cooling arrangements at the front end of the car are the same as in Figures 1 and 2, and at the tail end of the car they are substantially the same except that there is no rear radiator 3 and fan 12, the air stream $c$ merely discharging through louvres 21 in the top wall and louvres 22 in the end wall of the tail of the car under the suction of the main air flow along the car surface. If desired, however, I may provide a fan 12 for the forced discharge of the air stream $c$ through the louvres 22.

If it is desired to utilize some of the heat of the air stream $b$ for warming the interior of the car, I may provide louvres in the interior wall or bulk head 23 of the body at the sides of the petrol tank 15, controlled by adjustable shutters 24 (Figure 3).

The purpose of the by-pass pipe 13 and valve 14 is to cut the pump 4 partly out of action, under certain circumstances in order to prevent the water motor 7 and fan 8 from taking too much power.

The characteristics of fans or blowers are such that while the air delivery varies proportionately to their speed, the horsepower taken rises according to a curve law such that at high speeds a small increase of speed requires a proportionately large increase of horsepower. Thus it follows that while at normal speeds an increased flow of air may be produced at a relatively small expenditure of power, at high speeds, an equivalent increase of air flow will require a relatively large increase of power. In the case of a motor car this fact becomes important at low car speeds, viz. high engine speeds, for example in hill climbing. With the cooling system according to the present invention, in the absence of the by-pass arrangement 13, 14, in low gear the water motor 7 and fan 8 would run very fast and would absorb considerable horsepower, just at a time when all available engine power is required for the propulsion of the car. However, a comparatively large amount of power can be saved by reducing the speed of the water motor 7 without an undue reduction of the air flow, and this is accomplished by the by-pass 13, the valve 14 opening the by-pass passage when the water pressure produced by the pump 4 rises, due to increased engine speed, above a predetermined limit for which the spring of the valve 14 has been designed. When the valve 14 opens, part of the water flow short circuits the pump 4, and thus the water motor 7 runs at a lower speed in relation to the engine speed than it would otherwise run.

It should be understood of course, that the fan 8 must be so designed as to give a sufficient air flow through the radiator 2 for efficient cooling at low engine speeds, as, for instance, when the car is stationary and the engine idling, and that the action of the by-pass valve 14, when it comes into play and reduces the fan speed relatively to the engine speed, must be so adjusted as to ensure a sufficient air flow for hill climbing at high engine revolutions. Normally the by-pass will operate at about half the maximum engine revolutions.

Alternatively to driving the front fan 8 by means of water power it may, if desired, be driven electrically.

The installation already described is also suitable for evaporative or steam cooling, but in such cases steam is mainly substituted for water as the circulating medium.

The starting handle of the car is arranged to be inserted through an opening in the boss of the fan 12, so as to engage a dog carried on the end of the crank shaft, as otherwise the blades of the fan would be prevented from turning by the starting handle when in position.

Thermostatic control can be effected at some convenient point in the circulating system so as to keep the engine temperature constant.

It is to be clearly understood that the invention is not limited to the arrangement of parts and details of construction indicated by the drawings, but may be embodied in other forms of apparatus falling within the scope of the appended claims.

What I claim as my invention and desire to secure by Letters Patent is:—

1. A motor road vehicle including an engine disposed in the vicinity of the back axle, a radiator disposed in the front portion of the vehicle, a second radiator located in the rear portion of the car, a water reservoir tank located above the level of the engine and radiator, and pipes connecting said engine, radiator and tank into a closed water circulating system, and means for circulating water in said system under pressure.

2. A motor road vehicle including an engine disposed in the vicinity of the back axle, a radiator disposed in the front portion of the vehicle, a fan on the interior side of said radiator, a water motor for driving said fan, a water reservoir tank located above the level of the engine and radiator, pipes connecting up said engine, radiator, water motor and tank into a closed water circulating system, and means for circulating water throughout said system under pressure.

3. A motor road vehicle including an engine disposed in the vicinity of the back axle, a radiator disposed in the front portion of the vehicle, a second radiator located in rear of the engine at the tail end of the car, a water reservoir tank located above the level of the engine and radiator, pipes connecting up said engine, radiator and tank into a closed water circulating system, with said second radiator disposed between the front radiator outlet and the intake of the engine water jacket and means for circulating water in said system under pressure.

4. A motor road vehicle including a water cooled engine at the rear of the vehicle, a radiator at the front of the car discharging cooling water to said engine, a reservoir tank into which the engine jacket discharges, a fan for the front radiator, a water motor driving said fan and discharging low pressure water to the front radiator, and a water pump drawing low pressure water from the said reservoir tank and supplying it at high pressure to the water motor.

5. A motor road vehicle including an engine disposed in the vicinity of the back axle, a cooling water circulating system for the engine including a radiator disposed in the front of the car, recesses in the sides of the vehicle to accommodate the wheels in steering, and rearwardly facing openings in the walls of the vehicle behind the radiator, debouching into said recesses, the flow of air past said recesses drawing air through said openings and through said radiator, thereby cooling the water circulating system of the engine.

6. In a motor road vehicle having an engine disposed in the vicinity of the back axle, the provision in the bottom of the car, in front of the engine, of an opening through which air enters and passes over the engine crank case, whereafter it discharges through the end of the car.

7. In a motor road vehicle having an engine disposed in the vicinity of the back axle, and a radiator at the tail end of the car behind the engine, the provision in the bottom of the car, in front of the engine, of an opening through which air enters and passes over the engine crank case, whereafter it discharges through the end of the car.

8. In a motor road vehicle having an engine disposed in the vicinity of the back axle, a radiator at the front end of the vehicle, and a radiator at the tail end of the car behind the engine, the provision in the bottom of the car, behind the front radiator, of an opening through which air is discharged beneath the car after passing through said front radiator, and the provision in the bottom of the car in front of the engine, of an opening through which air enters and passes over the engine crank case, whereafter it discharges through the end of the car.

9. A motor road vehicle having an engine disposed in the vicinity of the back axle and a radiator at its front end, with openings in the walls of the car behind the radiator, including inclined surfaces behind the radiator for deflecting air passing through the radiator through said openings.

10. A motor road vehicle having an engine disposed in the vicinity of the back axle and a radiator at its front end, with openings in the walls of the car behind the radiator, including a petrol tank shaped to provide inclined surfaces behind the radiator for deflecting air passing through the radiator through said openings.

11. A motor road vehicle including an engine disposed in the vicinity of the back axle, a radiator disposed in the front portion of the vehicle, a water reservoir tank located above the level of the engine and radiator, pipes connecting up said engine, radiator and tank into a closed water circulating system, and means for circulating water throughout said system under pressure, said system operating as a drowned system.

12. A motor road vehicle including an engine disposed in the vicinity of the back axle, a radiator disposed in the front portion of the vehicle, a water reservoir tank located above the level of the engine and radiator, pipes connecting up said engine, radiator and tank into a closed water circulating system, a spring loaded relief valve at the highest point of said system, and means for circulating water throughout said system under pressure.

13. A motor road vehicle including an engine disposed in the vicinity of the back axle, a radiator disposed in the front portion of the vehicle, a water reservoir tank located above the level of the engine and radiator, pipes connecting up said engine, radiator and tank into a closed water circulating system, a spring loaded suction valve in said system, and means for circulating water throughout said system under pressure.

14. A motor road vehicle including an engine disposed in the vicinity of the back axle, a radiator disposed in the front portion of the vehicle, a fan in rear of, and mechanically driven by the engine, said fan discharging through the tail end of the car, a water reservoir tank located above the level of the engine and radiator, pipes connecting up said engine, radiator and tank into a closed water circulating system, and means for circulating water in said system under pressure.

15. A motor road vehicle including an engine disposed in the vicinity of the back axle, a radiator disposed in the front portion of the vehicle, a second radiator located in rear of the engine at the tail end of the car, a fan in rear of the engine and in front of the second radiator, mechanical driving means between the engine and fan, said fan discharging through said second radiator, a water reservoir tank located above the level of the engine and radiator, pipes connecting up said engine, radiator and tank into a closed water circulating system, and means for circulating water in said system under pressure.

16. A motor road vehicle including a water cooled engine at the rear of the vehicle, a radiator at the front of the car discharging cooling water to said engine, a reservoir tank into which the engine jacket discharges, a fan for the front radiator, a water motor driving said fan and discharging low pressure water to the front radiator, a water pump driving low pressure water from the water reservoir and supplying it at high pressure to the water motor, a by-pass pipe connection between the inlet and outlet of the pump, and a spring loaded control valve in said pipe connection which opens the by-pass when the pressure exceeds a certain value, and thus reduces the water pressure of the system, whereby the power absorbed by the front radiator fan and water motor is reduced.

CHARLES DENNISTOUN BURNEY.